(12) United States Patent
Berry

(10) Patent No.: US 11,519,288 B2
(45) Date of Patent: Dec. 6, 2022

(54) TURBOMACHINE CLEARANCE CONTROL USING BRUSH SEALS HAVING MAGNETICALLY RESPONSIVE FILAMENTS

(71) Applicant: General Electric Company, Schenectady, NY (US)

(72) Inventor: Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/126,301

(22) Filed: Dec. 18, 2020

(65) Prior Publication Data
US 2022/0195882 A1    Jun. 23, 2022

(51) Int. Cl.
*F01D 11/14* (2006.01)
*F16J 15/3288* (2016.01)

(52) U.S. Cl.
CPC ........... *F01D 11/14* (2013.01); *F16J 15/3288* (2013.01); *F05D 2240/56* (2013.01); *F05D 2260/32* (2013.01)

(58) Field of Classification Search
CPC ... F01D 11/14; F16J 15/3288; F05D 2240/56; F05D 2260/32
See application file for complete search history.

(56) References Cited

U.S. PATENT DOCUMENTS

| 3,983,435 | A | * | 9/1976 | Sims | ........................ | H02K 1/14 |
| | | | | | | 310/216.096 |
| 4,513,567 | A | | 4/1985 | Deveau et al. | | |
| 4,600,202 | A | * | 7/1986 | Schaeffler | ............ | F16J 15/3288 |
| | | | | | | 277/939 |
| 6,152,685 | A | | 11/2000 | Hagi | | |

(Continued)

FOREIGN PATENT DOCUMENTS

| GB | 2108586 A | 5/1983 |
| JP | 3564286 B2 | 9/2004 |

OTHER PUBLICATIONS

Https://www.apexmagnets.com/news-how-tos/magnetic-moments-magnetizerdemagnetizers-work/, Dec. 15, 2017 (Year: 2017).*

(Continued)

*Primary Examiner* — Kenneth Bomberg
*Assistant Examiner* — Ryan C Clark
(74) *Attorney, Agent, or Firm* — Dority & Manning, P.A.

(57) ABSTRACT

Sealing arrangements and rotor assemblies are provided. A sealing arrangement includes a stationary component, a rotating component spaced apart from the stationary component. A clearance is defined between the stationary component and the rotating component. The sealing arrangement further includes a plurality of magnets embedded within the rotating component. The sealing arrangement further includes a brush seal having a frame and a plurality of magnetically responsive filaments. The plurality of magnetically responsive filaments each extending from the frame to (Continued)

a free end. The plurality of magnetically responsive filaments are attracted to the rotating component by the plurality of magnets. The plurality of magnetically responsive filaments at least partially covering the clearance, such that a flow of fluid across the clearance is restricted.

19 Claims, 9 Drawing Sheets

(56) References Cited

U.S. PATENT DOCUMENTS

| | | | |
|---|---|---|---|
| 6,220,602 B1 * | 4/2001 | Webster | F16J 15/3288 277/378 |
| 6,435,513 B2 | 8/2002 | Skinner et al. | |
| 6,450,762 B1 | 9/2002 | Munshi | |
| 6,877,952 B2 | 4/2005 | Wilson | |
| 9,360,118 B2 | 6/2016 | Fukuhara | |
| 2007/0132190 A1 * | 6/2007 | Trabert | F01D 11/001 277/355 |
| 2010/0278645 A1 * | 11/2010 | Narita | F01D 11/08 415/230 |
| 2010/0303612 A1 * | 12/2010 | Bhatnagar | F01D 11/22 415/127 |
| 2010/0327534 A1 * | 12/2010 | Powar | F01D 11/02 277/355 |
| 2011/0200432 A1 * | 8/2011 | Alamsetty | F16J 15/3288 415/230 |
| 2016/0312637 A1 * | 10/2016 | Duguay | F16J 15/3288 |
| 2020/0003192 A1 * | 1/2020 | Li | F16J 15/3288 |

OTHER PUBLICATIONS

Helmenstine, Anne Marie, Ph.D. "How to Demagnetize a Magnet." ThoughtCo, Aug. 28, 2020, thoughtco.com/how-to-demagnetize-a-magnet-607873 (Year: 2020).*

* cited by examiner

US 11,519,288 B2

TURBOMACHINE CLEARANCE CONTROL USING BRUSH SEALS HAVING MAGNETICALLY RESPONSIVE FILAMENTS

FIELD

The present disclosure relates generally to turbomachine clearances. In particular, this disclosure relates to controlling clearances between stationary components and rotating components in a turbomachine.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

In certain applications, a clearance may exist between components that move relative to one another in the turbomachine. For example, a clearance may exist between rotary and stationary components in a rotary machine, such as a compressor, a turbine, or the like. The clearance may increase or decrease during operation of the rotary machine due to temperature changes or other factors. As can be appreciated, a smaller clearance may improve performance and efficiency in a compressor or turbine, because less fluid leaks between blades and a surrounding shroud. However, a smaller clearance also increases the potential for a rub condition. The operating conditions also impact the potential for a rub condition. For example, the potential for a rub condition may increase during transient conditions and decrease during steady state conditions.

Sealing assemblies are often positioned within the clearances to restrict the amount of flow passing through the clearance by keeping the space between the rotating component and the stationary component small without requiring the components to be close to one another.

Known sealing assemblies are most effective once the gas turbine has reached steady state operating conditions. For example, once both the rotor assembly and the stator assembly reach steady state operating temperatures, the assemblies have thermally expanded and fully engage the sealing assembly. As such, an improved sealing assembly for sealing between a rotor assembly and a stator assembly is desired in the art. In particular, a sealing assembly that is effective at all operating conditions of the gas turbine is desired.

BRIEF DESCRIPTION

Aspects and advantages of the sealing arrangements and rotor assemblies in accordance with the present disclosure will be set forth in part in the following description, or may be obvious from the description, or may be learned through practice of the technology.

In accordance with one embodiment, a sealing arrangement for use in a gas turbine is provided. The sealing arrangement includes a stationary component, a rotating component spaced apart from the stationary component. A clearance is defined between the stationary component and the rotating component. The sealing arrangement further includes a plurality of magnets embedded within the rotating component. The sealing arrangement further includes a brush seal having a frame and a plurality of magnetically responsive filaments. The plurality of magnetically responsive filaments each extending form the frame to a free end. The plurality of magnetically responsive filaments are attracted to the rotating component by the plurality of magnets. The plurality of magnetically responsive filaments at least partially covering the clearance, such that a flow of fluid across the clearance is restricted.

In accordance with another embodiment, a rotor assembly for a turbomachine is provided. The rotor assembly includes a plurality of rotor blades that extend radially outward from a rotor disk. each rotor blade in the plurality of rotor blades includes a platform, a tip shroud, and an airfoil that extends between the platform and the tip shroud. the tip shrouds of each rotor blade in the plurality of rotor blades collectively form a shroud ring that extends circumferentially around a centerline of the turbomachine. a casing is spaced apart from the shroud ring, the casing having a plurality of shroud blocks positioned therein such that a clearance is defined between the shroud ring and the shroud blocks. a plurality of magnets are embedded within the shroud ring. The rotor assembly further includes a brush seal having a frame and a plurality of magnetically responsive filaments. The plurality of magnetically responsive filaments each extending form the frame to a free end. The plurality of magnetically responsive filaments are attracted to the rotating component by the plurality of magnets. The plurality of magnetically responsive filaments at least partially covering the clearance, such that a flow of fluid across the clearance is restricted.

These and other features, aspects and advantages of the present the sealing arrangements and rotor assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present the sealing arrangements and rotor assemblies, including the best mode of making and using the present systems and methods, directed to one of ordinary skill in the art, is set forth in the specification, which makes reference to the appended figures, in which.

DETAILED DESCRIPTION

Figure 1:
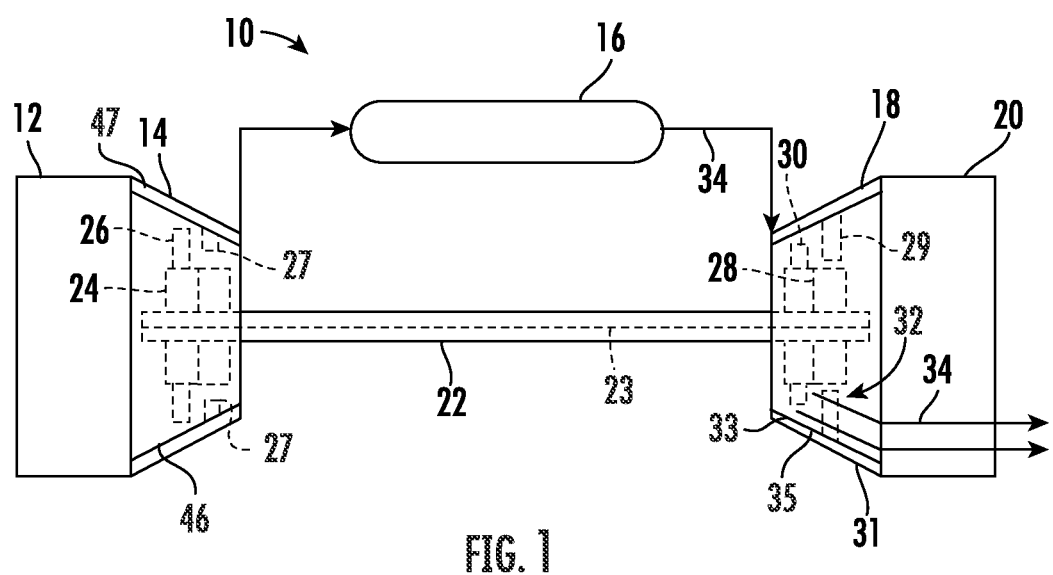
FIG. 1 is a schematic illustration of a turbomachine in accordance with embodiments of the present disclosure.
Figure 1:
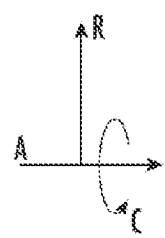

Reference now will be made in detail to embodiments of the present the sealing arrangements and rotor assemblies, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the term "clearance" or the like shall be understood to refer to a spacing or gap that may exist between two or more components of the system that move relative to one another during operation. The clearance may correspond to an annular gap, a linear gap, a rectangular gap, or any other geometry depending on the system, type of movement, and other various factors, as will be appreciated by those skilled in the art. In one application, the clearance may refer to the radial gap or space between housing components surrounding one or more rotating blades of a compressor, a turbine, or the like. By controlling the clearance using the presently disclosed techniques, the amount of leakage between the rotating blades and the housing may be actively reduced to increase operational efficiency, while simultaneously minimizing the possibility of a rub (e.g., contact between housing components and the rotating blades). As will be appreciated, the leakage may correspond to any fluid, such as air, steam, combustion gases, and so forth.

As discussed herein, a radial gap between the turbine blades and a shroud may increase or decrease during operation due to temperature changes or other factors. For instance, as the turbine heats up during operation, thermal expansion of the turbine housing components may cause the shroud to move radially away from the rotational axis, thus increasing the clearance between the blades and the shroud. This is generally undesirable because combustion gases that bypass the blades via the radial gap are not captured by the blades and are, therefore, not translated into rotational energy. This reduces the efficiency and power output of the turbine engine.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14. The compressor 12 further includes one or more stator vanes 27 arranged circumferentially around the shaft 22. The stator vanes 27 may be fixed to at least one of an outer casing 47 and an inner casing 46 that extends circumferentially around the rotor blades 26.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer turbine casing 31 and an inner turbine casing 33 that circumferentially surround the portion of the shaft 22 and the rotor blades 30, thereby at least partially defining a hot gas path 32 through the turbine section 18. The inner turbine casing 33 may be configured to support a plurality of stages of stationary nozzles 29 extending radially inwardly from the inner circumference of the inner turbine casing 33. The inner turbine casing 33 may also be configured to support a plurality of shroud sections or blocks 35 that, when installed around the inner circumference of the inner turbine casing 33, abut one another so as to define a substantially cylindrical shape surrounding the shaft 22.

During operation, a working fluid such as air flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

As shown, the gas turbine 10 may define an axial direction A substantially parallel to and/or along an axial centerline 23 of the gas turbine 10, a radial direction R perpendicular to the axial centerline 23, and a circumferential direction C extending around the axial centerline 23.

Figure 2:
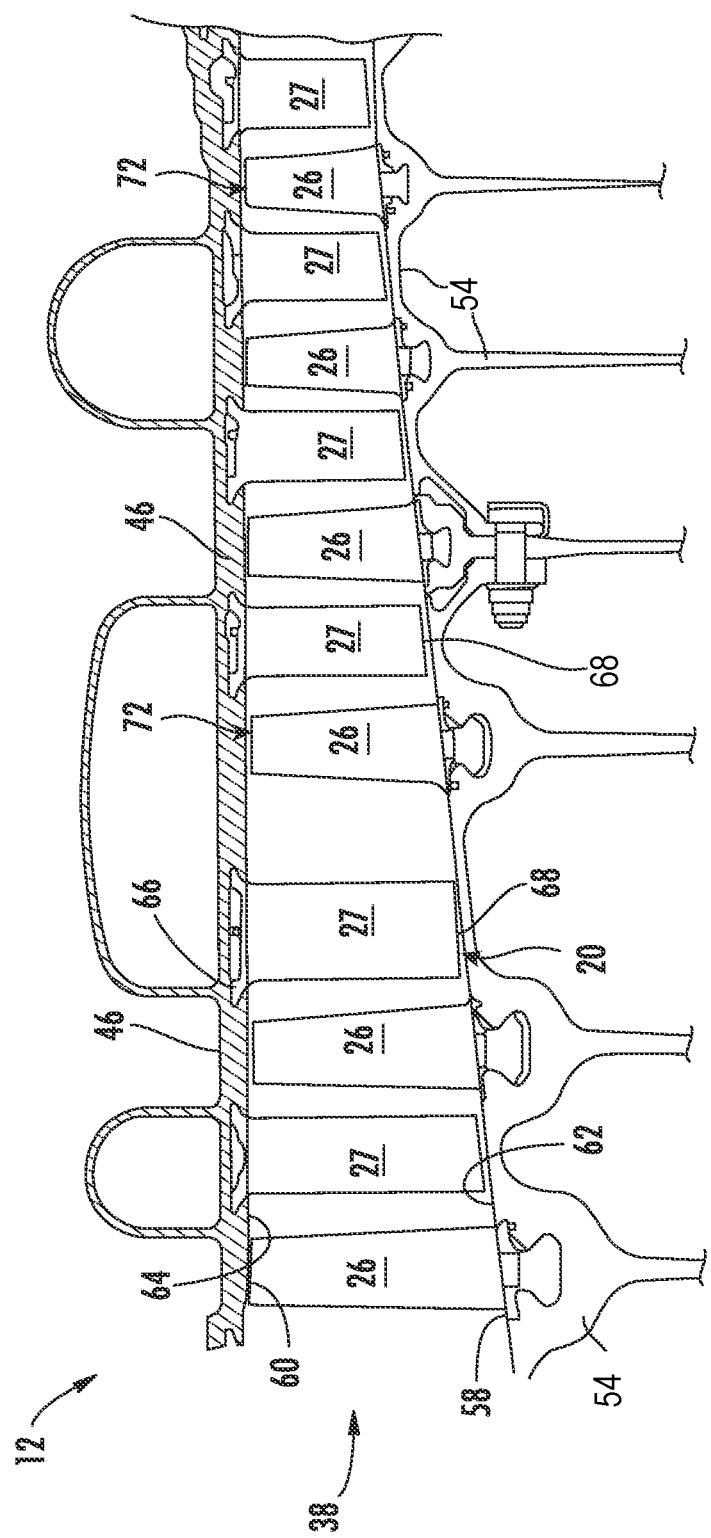
FIG. 2 illustrates a cross sectional view of a compressor section in accordance with embodiments of the present disclosure.

FIG. 2 is a cross sectional view of the major components of an exemplary gas turbine compressor section, including rotor and stator assemblies. The compressor section 12 includes a rotor assembly positioned within inner casing 46 to define a compressed air 38 flow path. The rotor assembly also defines an inner flow path boundary 62 of flow path 38, while the stator assembly defines an outer flow path boundary 64 of compressed air 38 flow path. The compressor section 12 includes a plurality of stages, with each stage including a row of circumferentially-spaced rotor blades 26 and a row of stator vanes 27. In this embodiment, rotor blades 26 are coupled to a rotor disk 54 with each rotor blade extending radially outwardly from rotor disk 54. Each rotor blade 26 includes an airfoil that extends radially from an inner blade platform 58 to rotor blade tip 60. A clearance 72 may be defined radially between the tip 60 of the rotor blade 26 airfoil and the inner casing 46. Similarly, the stator assembly includes a plurality of rows of stator vanes 27 with each row of vanes 27 positioned between adjacent rows of rotor blades 26. The compressor stages are configured to cooperate with a compressed air 38 working fluid, such as ambient air, with the working fluid being compressed in succeeding stages. Each row of stator vanes 27 extend radially inward from the inner casing 46 and includes an airfoil that extends from an outer vane platform 66 to a vane tip 68. A clearance 70 may be defined both radially between the tip 68 of the stator vane 27 airfoil and the rotor disk 54. Each airfoil includes a leading edge and a trailing edge as shown.

Figure 3:
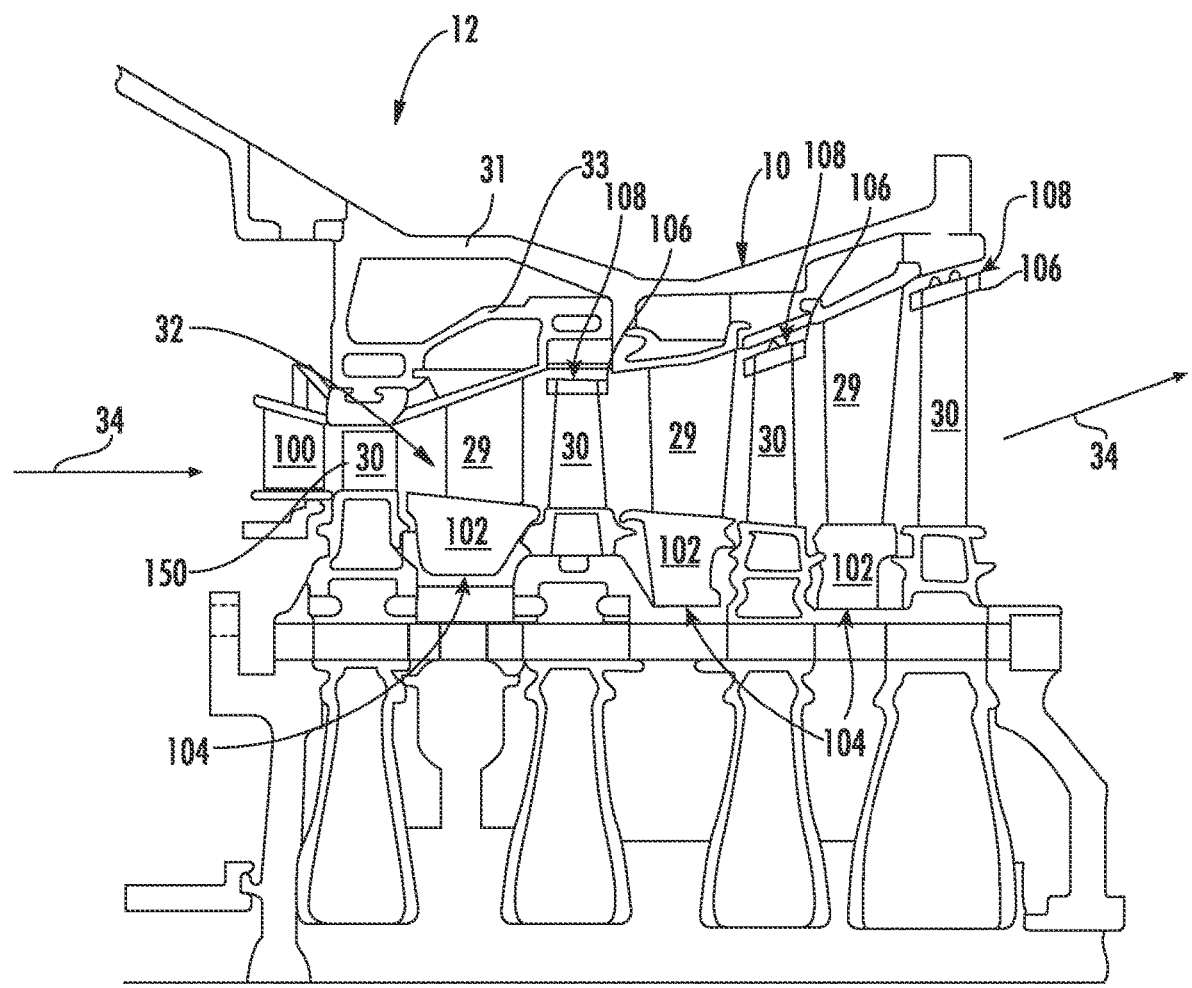
FIG. 3 illustrates a cross-sectional view of a turbine section, in accordance with embodiments of the present disclosure.

FIG. 3 illustrates an exemplary turbine section 18 of the gas turbine 10 including a plurality of turbine stages arranged in serial flow order. Each stage of the turbine includes a row of stationary turbine nozzles or vanes (e.g., stationary nozzles 29) disposed axially adjacent to a corresponding rotating row of turbine rotor blades (e.g., blades 30). Four turbine stages are illustrated in FIG. 3. The exact number of stages of the turbine section 18 may be more or less than the four stages illustrated in FIG. 3. The four stages are merely exemplary of one turbine design and are not intended to limit the presently claimed turbine rotor blade in any manner.

Each stage comprises a plurality stationary nozzles 29 and a plurality of turbine rotor blades 30. The stationary nozzles 29 are mounted to the inner turbine casing 33 and are annularly arranged about an axis of a turbine rotor 36. Each stationary nozzle 29 may extend radially inward from the inner casing 33 to a stator shroud 102 coupled to the tip of the stationary nozzle 29. When the stationary nozzles 29 are installed around the inner circumference of the inner turbine casing 33, the stator shrouds 102 abut one another so as to define a substantially cylindrical shape surrounding the shaft turbine rotor 36. A clearance 104 may be defined radially between stator shroud 102 and the turbine rotor 36. The clearance 104 may extend continuously in the circumferential direction C around the turbine rotor 36.

As shown, the turbine rotor blades 30 are annularly arranged about the turbine rotor 36 and are coupled to the turbine rotor 36. Each turbine rotor blade 30 may include an airfoil having a leading edge, a trailing edge, a pressure side surface, and a suction side surface. In some embodiments, as shown, the turbine rotor blade 30 may include a tip shroud 106. When the turbine rotor blades 30 are installed around the inner circumference of the inner turbine casing 33, the tip shrouds 106 may abut one another so as to define a substantially cylindrical shape surrounding the airfoils and of the turbine rotor blades 30 and the turbine rotor 36. In many embodiments, a clearance 108 may be defined radially between stator shroud 102 and the turbine rotor 36. The clearance 108 may extend continuously in the circumferential direction C around the turbine rotor 36.

Figure 4:
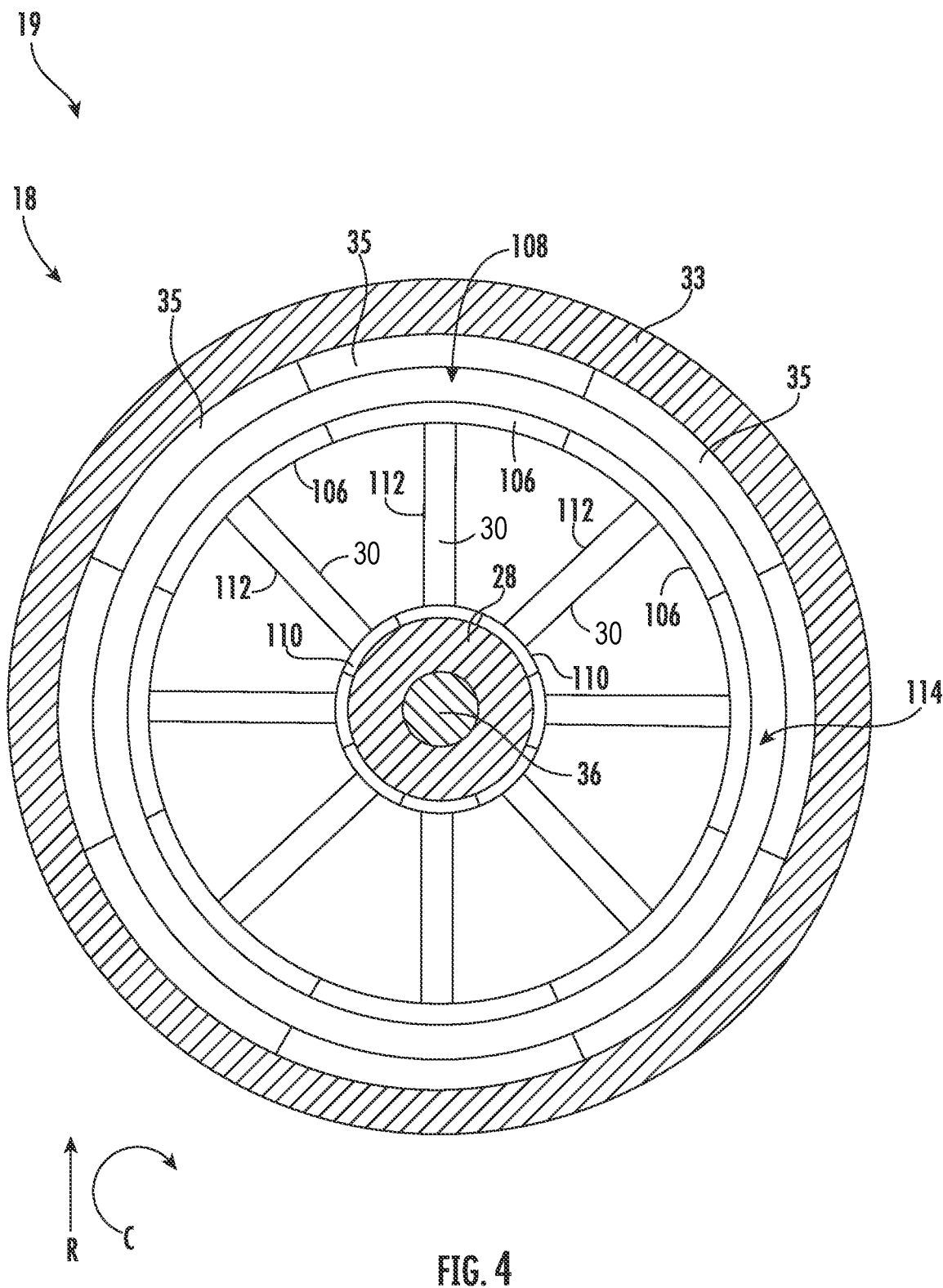
FIG. 4 illustrates a cross-sectional view of a rotor assembly of a turbine section, in accordance with embodiments of the present disclosure.

FIG. 4 illustrates a cross-sectional view of a rotor assembly 19 of the turbine section 18 from along an axial centerline of the gas turbine 10, in accordance with embodiments of the present disclosure. As shown in FIG. 4, a plurality of rotor blades 29 extend radially outward from a rotor disk 28. In many embodiments, each rotor blade 29 in the plurality of rotor blades 29 includes a platform 110, a tip shroud 106, and an airfoil 112 that extends radially between the platform 110 and the tip shroud 106. As shown, the tip shrouds 106 of each rotor blade 29 in the plurality of rotor blades 29 abut one another to collectively form a shroud ring 114 that extends continuously circumferentially around a centerline of the gas turbine 10. For example, the shroud ring 114 extends around the turbine rotor 36. In many embodiments, the inner turbine casing 33 may be spaced apart (e.g. radially spaced apart) from the shroud ring 114 such that a clearance 108 is defined between the shroud ring 114 and the inner turbine casing 33. In some embodiments, the inner turbine casing 33 may support a plurality of shroud sections or blocks 35 that, when installed around the inner circumference of the inner turbine casing 33, abut one another so as to define a substantially cylindrical shape surrounding a portion of a turbine rotor 36 of the gas turbine 10. For example, the shroud blocks 35 may be supported by the inner turbine casing 35 such that they encase or surround one of a plurality of stages of rotor blades 29 turbine section 18. In such embodiments, the clearance 108 may be defined between the tip shroud 106 of the rotor blades 29 and the shroud blocks 35 of the inner turbine casing 33.

Figure 5:
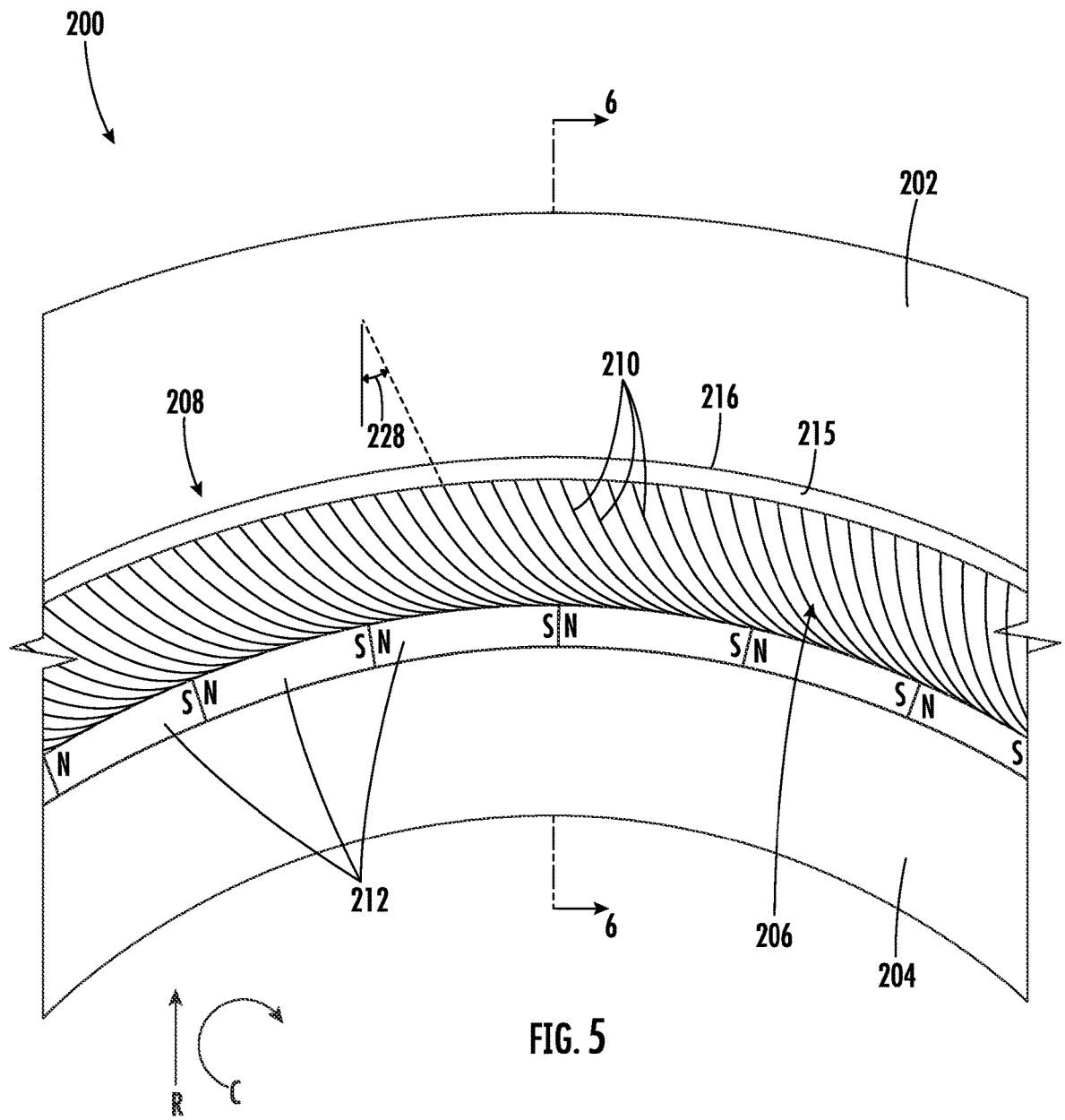
FIG. 5 illustrates a sealing arrangement, in accordance with embodiments of the present disclosure.

FIG. 5 illustrates a sealing arrangement 200 for use in a turbomachine, such as the gas turbine 10 described herein, in accordance with embodiments of the present disclosure. The sealing arrangement 200 may include a stationary component 202 of the gas turbine 10, such as the inner casing 46 of the compressor section 14, one or more stator vanes 27 of the compressor section 14, the inner turbine casing 33, one or more stationary nozzles 29 of the turbine section 18, one or more shroud blocks 35, or other stationary gas turbine 10 components.

The sealing arrangement 200 may further include a rotating component 204, i.e., a component that rotates in the circumferential direction C of the gas turbine 10. In many embodiments, the rotating component 204 may be directly or indirectly attached to the shaft 22, thereby rotating in the circumferential direction C along with other gas turbine 10 components. The rotating component 204 may be, but is not limited to, a rotor blade 26 of the compressor section 14, a rotor disk 24 of the compressor section 14, a rotor blade 30 of the turbine section 18, or a rotor disk 28 of the turbine section 18.

As shown in FIG. 5, a clearance 206 may be defined between the stationary component 202 and the rotating component 204, in order to prevent frictional wear between the stationary component 202 and the rotating component 204. As may be appreciated, due to the high operating temperatures of the gas turbine 10, either or both of the stationary component 202 and the rotating component 204 may experience thermal expansion and contraction, thereby altering the distance between the components 202, 204 and the clearance 206. The clearance 206 may between the stationary component 202 and the rotating component 204 may be representative of any of the other clearances discussed herein, e.g., clearance 70, clearance 72, clearance 104, and/or clearance 108. In exemplary embodiments, the clearance 206 may be defined between the turbine rotor blade 29 tip shrouds 106 and the plurality of shroud blocks 35 (FIG. 4). One of ordinary skill in the art should understand that the present subject matter is not limited to any particular configuration and that the sealing arrangement 200 described herein may be advantageous for any stationary component and rotating component of the gas turbine 10.

Figure 6:
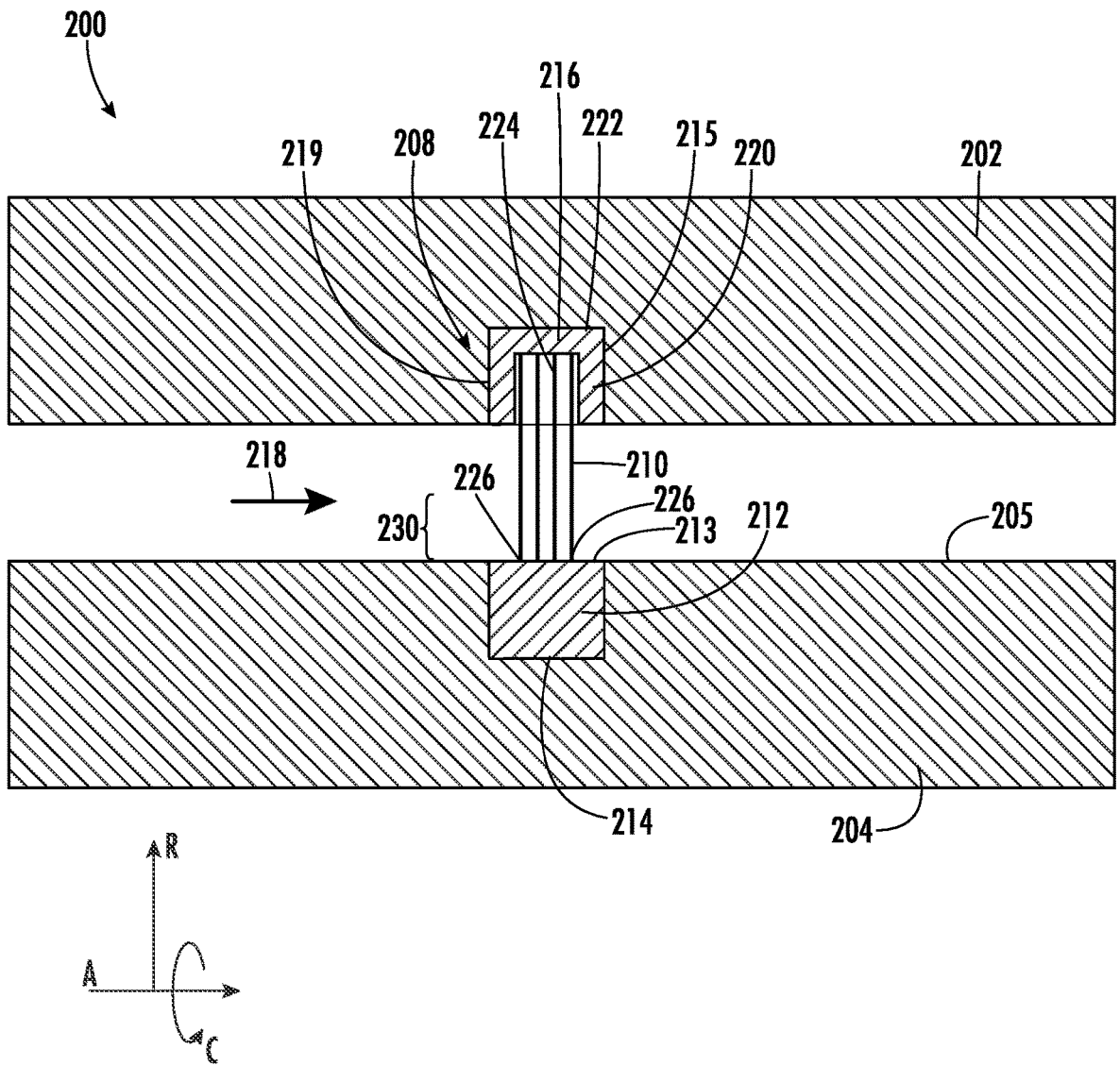
FIG. 6 illustrates a cross sectional view of a sealing arrangement, in accordance with embodiments of the present disclosure.

FIG. 6 illustrates a cross-sectional view of the sealing arrangement 200 from along the circumferential direction C. As shown in FIGS. 5 and 6 collectively, the sealing arrangement 200 may include a plurality of magnets 212 embedded within the rotating component 204, such that the rotating component produces a magnetic field within the clearance 206 that draws magnetically responsive objects towards the rotating component 204. In exemplary embodiments, the plurality of magnets 212 may be embedded within the rotating component 204 such that a radially outer surface 205 (FIG. 6) of the rotating component 204 is flush, and aligns with, radially outer surfaces 213 of the plurality of magnets 212. In this way, the radially outer surfaces 205, 213 may form a single smooth and continuous surface in the axial direction A. In many embodiments, the rotating component 204 may define a groove or slot 214 in the radial and circumferential directions, in which the plurality of magnets 212 are positioned. In particular embodiments, the plurality of magnets 212 may be fixedly coupled (via a braze or weld joint) to the rotating component 204 within the slot 214. In other embodiments, the plurality of magnets 212 may be coupled to slot 214 of the rotating component 204 via an interference fit.

Although the plurality of magnets 212 are shown in FIG. 5 as having the poles (north pole "N" and south pole "S") labeled on specific ends, it is envisioned to be within the scope of the present disclosure that each of the poles may be switched, thereby yielding the same configuration but with an opposite magnetic pole orientation.

As shown in FIGS. 5 and 6 collectively, the sealing arrangement 200 may further include a brush seal 208 disposed within the clearance 206, in order to restrict a leakage flow 218 between the stationary component 202 and the rotating component 204, thereby increasing the efficiency of the gas turbine 10. The leakage flow 218 may be excess air (if sealing arrangement 200 is within compressor section 14) or excess combustion gases (if sealing arrangement 200 is in turbine section 18). As may be appreciated, minimizing the amount of leakage flow 218 passing across the clearance 206 may advantageously increase the overall efficiency of the gas turbine 10 by minimizing waste.

In many embodiments, the brush seal 208 may include a frame 215 that is embedded within the stationary component 202, e.g., the frame 215 may be fixedly coupled to a slot 216 defined radially within the stationary component 202. The slot 216 may extend continuously in the circumferential direction C around the axial centerline of the gas turbine 10, such that the brush seal 208 may extend 360° around the centerline of the gas turbine 10. The frame 215 may include a forward plate 219, an aft plate 220, and an end plate 222. In exemplary embodiments, the frame 215 may be formed at least partially from a ferrous material (or combinations of ferrous materials), such as iron, nickel, cobalt, or others, such that the frame 215 is responsive when in the presence of a magnetic field.

In exemplary embodiments, a plurality of magnetically responsive filaments 210 may extend from the frame 215, across the clearance 206, to the rotating component 204. As a result, the leakage flow 218 may be restricted or sealed by the plurality of magnetically responsive filaments 210 that at least partially cover the clearance 206. For example, each magnetically responsive filament 210 in the plurality of magnetically responsive filaments 210 may extend from a base 224 fixedly coupled to the frame 215 (via a braze joint or weld joint), across the clearance 206, to a free end 226 that is in movable contact with the rotating component 204 (or the surfaces 213 of the magnets 212). For example, the base 224 of the each magnetically responsive filament 210 may be fixedly coupled to the end plate 222 of the frame 215. In other embodiments (not shown), the brush seal 208 may not include a frame 215, such that the plurality of magnetically responsive filaments 210 extend directly from the slot 216 of the stationary component 202 to the rotating component 204.

The plurality of magnetically responsive filaments 210 may be in the form of wires that extend between the stationary component 202 and the rotating component 204, in order to cover the clearance 206. The plurality of magnetically responsive filaments 210 may each have a diameter of between about 0.0001-0.01 inches, or between about 0.0001-0.001 inches or between about 0.001-0.007, or between about 0.002-0.006 inches, or between about 0.003-0.005 inches. The relatively small diameter advantageously allows the magnetically responsive filaments 210 to bend and flex according to a pressure load between the stationary component 202 and the rotating component 204 or in response to the magnetic field of the plurality of magnets 212.

In exemplary embodiments, the plurality of magnetically responsive filaments 210 may extend between the stationary component 202 and the rotating component 204 at an angle, in order to allow the magnetically responsive filaments 210 to slide along the radially outer surface 213 of the magnets 212, which rotate along with the rotating component 204. For example, the plurality of magnetically responsive filaments 210 may sloped with respect to the radial direction R of the gas turbine 10, such that the plurality of magnetically responsive filaments slide along a surface of the magnets 212 during operation of the gas turbine 10. In many embodiments, each magnetically responsive filament 210 may form an oblique angle 228 with the radial direction R of the gas turbine 10 that is between about 5 degrees and about 95 degrees. In other embodiments, each magnetically responsive filament 210 may form an oblique angle 228 with the radial direction R of the gas turbine 10 that is between about 20 degrees and about 70 degrees. In various embodiments, each magnetically responsive filament 210 may form an oblique angle 228 with the radial direction R of the gas turbine 10 that is between about 30 degrees and about 60 degrees. In particular embodiments, each magnetically responsive filament 210 may form an oblique angle 228 with the radial direction R of the gas turbine 10 that is between about 35 degrees and about 55 degrees. The oblique angle 228 advantageously allows the magnetically responsive filaments 210 to slide along the surface of the rotating component 204 (or the surface of the magnets 212) without buckling or bending in an unintended manner.

In many embodiments, the plurality of magnetically responsive filaments 210 are formed at least partially from a ferrous material (or combinations of ferrous materials), such as iron, nickel, cobalt, or others, such that the filaments 210 are responsive when in the presence of a magnetic field. In such embodiments, each magnetically responsive filament 210 may include a magnetic portion 230. For example, the magnetic portion 230 may be formed from a ferrous material and may be disposed between a body of the filament 210 and at the free end 226, in order to pull the free end 226 of the filament 210 towards the magnets 212 by a magnetic field produced by the magnets 212. The magnetic portion 230 may be defined between the body of the filaments 210 and the free end 226, such that the magnetic portion 230 makes up 50% of the total length of the filament 210, or such that the magnetic portion 230 makes up 40% of the total length of the filament 210, or such that the magnetic portion 230 makes up 30% of the total length of the filament 210. In some embodiments, the filaments 210 may be formed from a non-ferrous material (such as aluminum, copper, lead, tin, titanium, zinc, or others), and the magnetic portion 230 may comprised a ferrous or magnetic coating on the outer surface of the filaments 210 (such as a ferrous metal powder coating or magnetic powder coating). In other embodiments, the plurality of magnetically responsive filaments 210 may each be formed entirely from a ferrous material (or combination of ferrous materials).

In exemplary embodiments, the plurality of magnetically responsive filaments 210 may be attracted to the plurality of magnets 210 embedded within the rotating component, which advantageously increases the effectiveness of the brush seal 208. For example, the sealing arrangement 200 described herein advantageously allows the plurality of magnetically responsive filaments 210 to extend or retract to cover the clearance 206 at any operating condition of the gas turbine 10. For example, during the start-up of the gas turbine 10, the stationary component 202 and the rotating component 204 may have not experienced much thermal growth, thereby making the clearance 206 larger in the radial direction R. In such conditions, the plurality of magnetically responsive filaments 210 may be pulled towards the rotating component 204 by the magnetic field produced by the plurality of magnets 212, thereby reducing the oblique angle 228 and extending the radial length of the plurality of magnetically responsive filaments 210. In this way, the plurality of magnetically responsive filaments 210 may be forced into sealing engagement (or contact) with the rotating component 204 by the magnetic field produced by the plurality of magnets 212 at any operating condition of the gas turbine 10. For example, the plurality of magnetically responsive filaments 210 maybe movable between a minimum thermal growth state of the components 202, 204, where the radial distance between the components 202, 204 is a maximum, and a maximum thermal growth state of the components 202, 204, where the radial distance between the components 202, 204 is a minimum.

In many embodiments, the plurality of magnets 212 may be permanent magnets, such that the magnets 212 are made of a material(s) that is magnetized by an external magnetic field and remains magnetized after the external field is removed. In this way, the magnets 212 continuously create their own magnetic field, to which the plurality of magnetically responsive filaments 216 are attracted. In many embodiments, the magnets 212 may be in the form of a piece of metal material that has its component atoms so ordered that the material exhibits properties of magnetism, such as attracting other iron-containing objects or aligning itself in an external magnetic field. In exemplary embodiments, the magnets 212 may be Alnico magnets, such that they are permanent magnets that are primarily made up of a combination of aluminum, nickel, and cobalt but may also include copper, iron and titanium. Alnico magnets may be capable of operation in extremely high temperatures, such as upwards of 1000° F.

Figure 7:
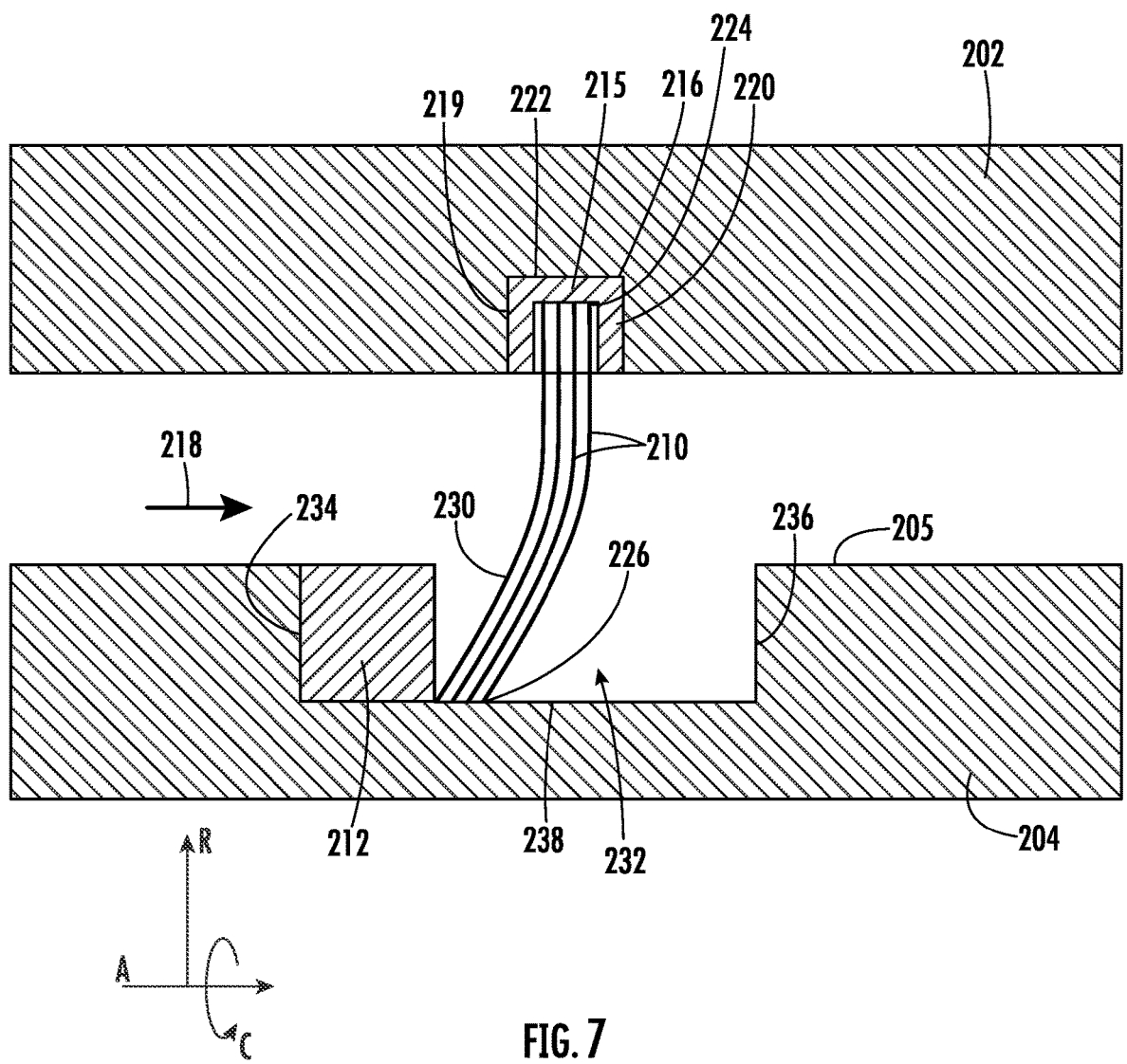
FIG. 7 illustrates a cross sectional view of a sealing arrangement, in accordance with embodiments of the present disclosure.

FIG. 7 illustrates another embodiment of the sealing assembly 200, in which the rotating component 204 defines a trench 232. The trench 232 may be defined radially inward from the radially outer surface 205 of the rotating component 204, such that the trench includes a forward wall 234, an aft wall 236 axially spaced apart from the forward wall 234, and a floor 238 extending between the forward wall 234 and the aft wall 236. In such embodiments, the plurality of magnets 212 may be positioned adjacent one of the forward wall 234 or the aft wall 236 of the trench 232. For example, the plurality of magnets 212 may be positioned directly adjacent one of the forward wall 234 or the aft wall 236 of the trench 232, such that the magnets 212 contact the forward wall 234 or the aft wall 236. In exemplary embodiments, the magnets 212 may be positioned in the forward wall 234, such that the magnetically responsive filaments 210 are pulled in a direction opposite the leakage flow 218, thereby bunching the filaments together and advantageously restricting more of the leakage flow 218 across the filaments 210.

Figure 8:
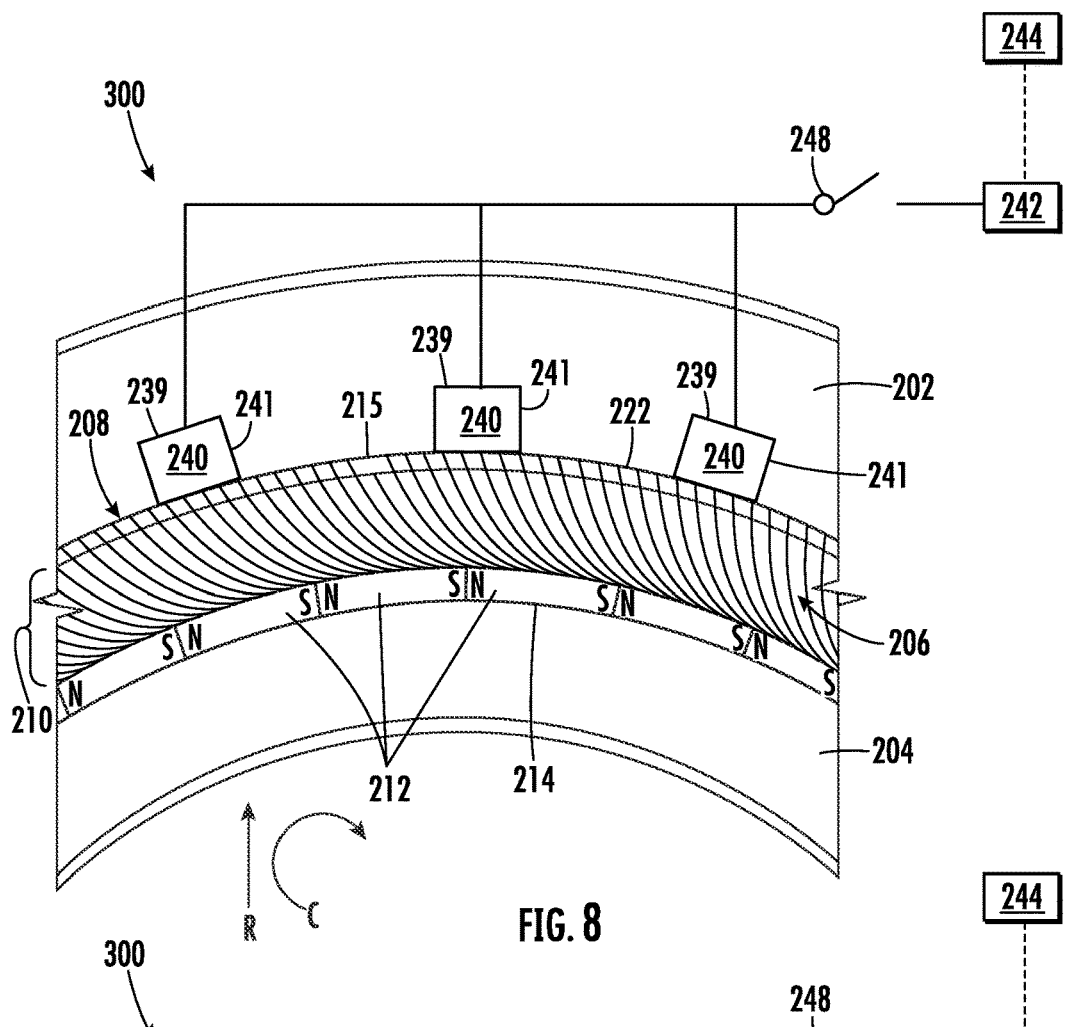
FIG. 8 illustrates a sealing arrangement having a brush seal in an engaged position, in accordance with embodiments of the present disclosure.
Figure 9:
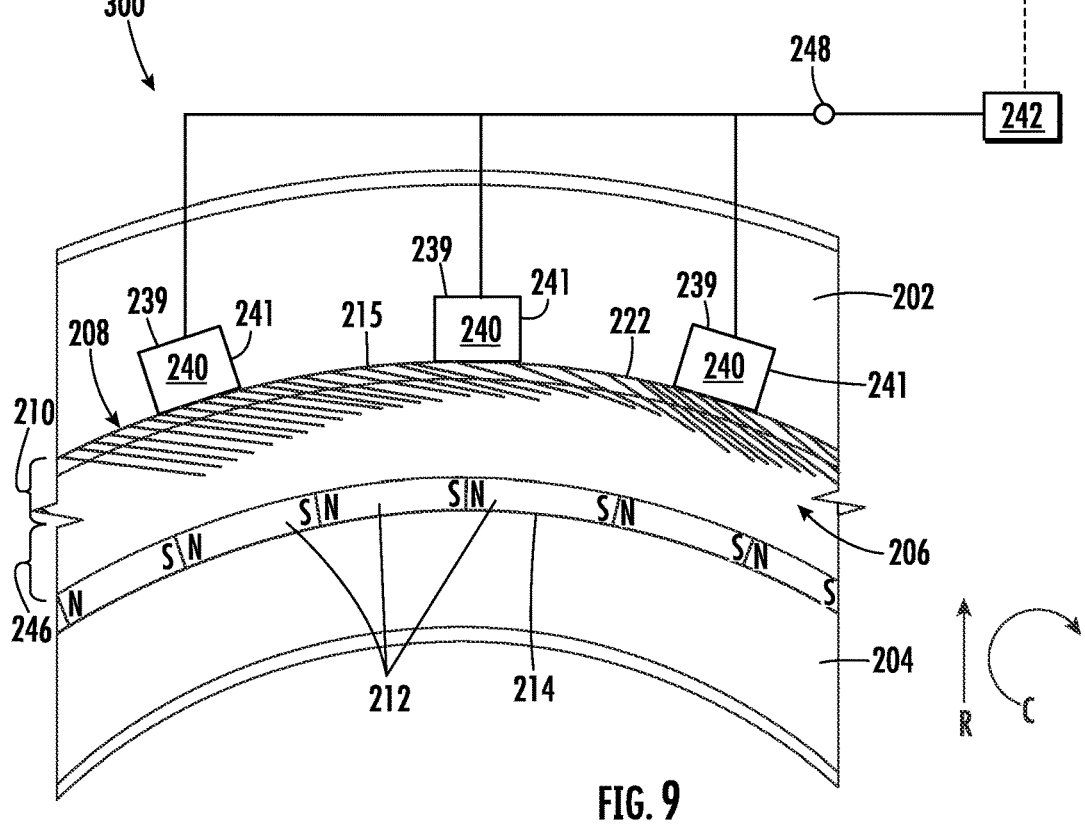
FIG. 9 illustrates a sealing arrangement having a brush seal in a disengaged position, in accordance with embodiments of the present disclosure.

FIG. 8 illustrates a sealing arrangement 300 for use in a turbomachine, in which the plurality of magnetically responsive filaments 210 are in a retracted position (not in contact with rotating component 204). FIG. 9 illustrates the sealing arrangement 300, in which the plurality of magnetically responsive filaments 210 are in an engaged position (in contact with rotating component 204). As shown in FIGS. 8 and 9, the plurality of magnets 212 may be a first plurality of magnets 212 positioned within the rotating component 204, and the sealing assembly may further include a second plurality of magnets 240 positioned within the stationary component 202 adjacent to the frame 215 of the brush seal 208. For example, the plurality of second magnets 240 may be attached directly to the frame 215, such as attached to the end wall 222 of the frame 215.

In some many embodiments, the plurality of second magnets 240 may be electromagnets 241. As shown, the electromagnets 241 are configured to be activated (FIG. 9), in which the electromagnets 241 emit a magnetic field, and deactivated (FIG. 8), in which the electromagnets do not emit a magnetic field. When the electromagnet 226 is activated, the electromagnet 226 emits an electromagnetic field that attracts the plurality of magnetically responsive filaments 210 towards the stationary component 202 and into a retracted position (FIG. 9). For example, the electromagnets 241 may be electrically coupled to a power supply 242. A switch 248 may deactivate the electromagnets 241 by disconnecting the power supply 242 when in an open position (FIG. 8). When in a closed position (FIG. 9), the switch 248 may connect the electromagnets 241 to the power supply 242, thereby enabling the electromagnetic field, which retracts the plurality of magnetically responsive filaments 210. As shown in FIG. 9, when the electromagnets 241 are activated, the filaments 210 may move towards the stationary component 202 (out of contact with the rotating component 204 and/or the magnets 212), such that a radial gap 246 is defined between the filaments 210 and the rotating component 204. The switch 242 may be in operative communication with a controller 244, which may open or close the switch thereby activating or deactivating the electromagnets 241. In this way, the electromagnet 241 may advantageously allow the brush seal 208 to be deactivated when necessary, such as during an assembly process, repair of the gas turbine 10, or during certain operating conditions. The electromagnets 241 may emit a more powerful magnetic field than the magnets 212, such that when the electromagnets 241 are activated, the filaments 210 move towards the electromagnets 240 and away from the magnets 212.

In other embodiments, the plurality of second magnets 240 may be a plurality of actuatable permanent magnets 239 attached to the frame 215. In such embodiments, the plurality of actuatable permanent magnets 239 may each be actuated by the controller 244 between a deactivated position (FIG. 8), in which the magnets 239 do not emit a magnetic field, and an activated position (FIG. 9), in which the magnets 239 do emit a magnetic field. wherein each actuatable permanent magnet includes cylindrical magnets positioned in a housing, the cylindrical magnets are actuatable between an activated position and a deactivated position by a controller.

Figure 10:
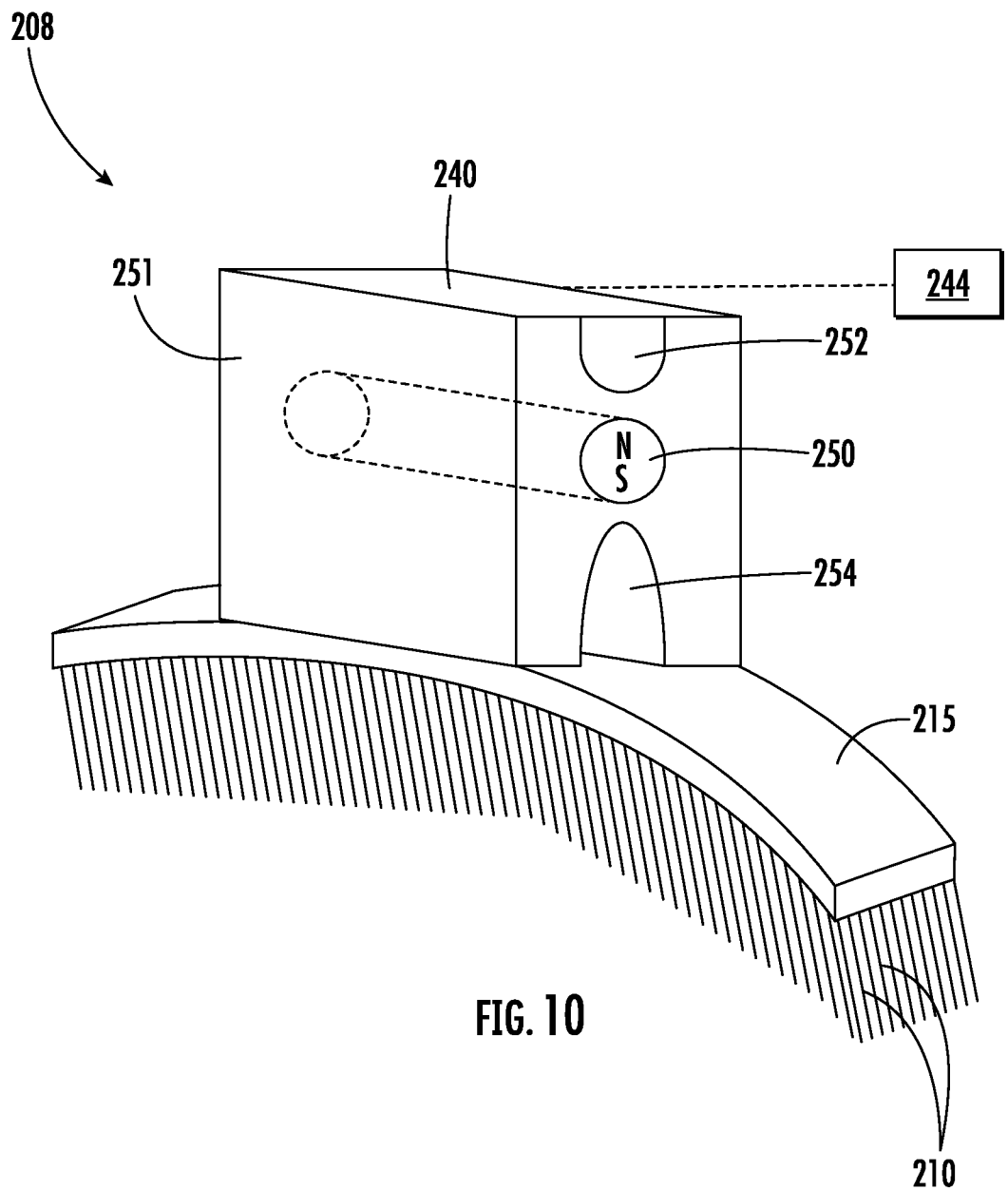
FIG. 10 illustrates a perspective view of a brush seal, in accordance with embodiments of the present disclosure.

FIG. 10 illustrates a perspective view of a brush seal 208, in accordance with embodiments of the present disclosure. As shown, the brush seal 208 may include a frame 215, a plurality of magnetically responsive filaments 210 extending from the frame 215, and a second magnet 240 attached to the frame 215 opposite the filaments 210. In the embodiment shown in FIG. 10, the second magnet 240 may an actuatable permanent magnet 239. As shown, the actuatable permanent magnet 239 may include a housing 251, a cylindrical magnet 250 positioned within the housing 251, a ferrous material 254 positioned within the housing 251 and in contact with the frame 215, and a non-ferrous material 252 positioned within the housing 251 opposite the ferrous material 254. The cylindrical magnet 250 may be rotatably actuated within the housing 251 by a controller 244 between a deactivated position (FIG. 8), in which the cylindrical magnet 250 is positioned such that no magnetic field is generated by the ferrous material 254, and an activated position (FIG. 9), in which the cylindrical magnet 250 is positioned such that a magnetic field is generated by the ferrous material 254.

In various embodiments, the sealing assemblies 200, 300 described herein may employed any of the clearances discussed herein, e.g., clearance 70, clearance 72, clearance 104, and/or clearance 108, in order to restrict leakage flow between a stationary component and a rotating component of the gas turbine. In exemplary embodiments, the sealing assemblies 200, 300 described herein may be employed in the rotor assembly 19 (FIG. 4) described herein, such as within the clearance 108. In such embodiments, the shroud blocks 35 may be the stationary component, such that the frame 215 of the brush seal 208 may be attached to the shroud blocks 35 (thereby indirectly coupling the brush seal 208 to the inner casing 33). The shroud ring 114 may be the rotating component, such that the plurality of magnets 212 may be embedded within the shroud ring 114 of the rotor blades 29. The plurality of filaments 210 may extend across the clearance 108, in order to advantageously restrict and/or prevent combustion gases from passing through the clearance 108.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A sealing arrangement for use in a turbomachine, the sealing arrangement comprising:
   a stationary component;
   a rotating component spaced apart from the stationary component such that a clearance is defined between the stationary component and the rotating component;
   a plurality of magnets embedded within the rotating component; and
   a brush seal comprising:
   a frame attached to the stationary component; and
   a plurality of magnetically responsive filaments each extending from the frame to a free end, wherein the plurality of magnets is oriented such that the plurality of magnetically responsive filaments is attracted to and forced into sealing engagement with the rotating component by the plurality of magnets, the plurality of magnetically responsive filaments at least partially covering the clearance, whereby a flow of fluid across the clearance is restricted.

2. The sealing arrangement as in claim 1, wherein the plurality of magnetically responsive filaments is sloped with respect to a radial direction of the turbomachine such that the plurality of magnetically responsive filaments slide along a surface of the rotating component during operation of the turbomachine.

3. The sealing arrangement as in claim 1, wherein the rotating component defines a trench having a forward wall and an aft wall, and wherein the filaments extend into the trench between the forward wall and the aft wall.

4. The sealing arrangement as in claim 3, wherein plurality of magnets is positioned adjacent to one of the forward wall or the aft wall of the trench, the plurality of magnets being axially spaced from the other of the forward or the aft wall and axially spaced from the frame.

5. The sealing arrangement as in claim 1, wherein the plurality of magnetically responsive filaments is formed at least partially from a ferrous material.

6. The sealing arrangement as in claim 1, wherein the plurality of magnetically responsive filaments is formed of a non-ferrous material that is at least partially coated with a ferrous material.

7. The sealing arrangement as in claim 1, wherein the plurality of magnets is a first plurality of magnets, wherein a second plurality of magnets is embedded within the stationary component adjacent to the frame.

8. The sealing arrangement as in claim 7, wherein the second plurality of magnets is configured to be activated and deactivated, and wherein the plurality of magnetically responsive filaments is configured to move towards the stationary component to a retracted position when the second plurality of magnets is activated.

9. The sealing arrangement as in claim 8, wherein the second plurality of magnets is a plurality of electromagnets controllable by a controller.

10. The sealing arrangement as in claim 4, wherein the plurality of magnets comprises a radially outer surface and a side surface, and wherein the plurality of magnetically responsive filaments extend into the trench and towards the side surface.

11. A rotor assembly for a turbomachine, the rotor assembly comprising:
  a plurality of rotor blades extending radially outward from a rotor disk, each rotor blade in the plurality of rotor blades including a platform, a tip shroud, and an airfoil extending between the platform and the tip shroud, wherein the tip shrouds of each rotor blade in the plurality of rotor blades collectively form a shroud ring that extends circumferentially around a centerline of the turbomachine;
  a casing spaced apart from the shroud ring, the casing having a plurality of shroud blocks positioned therein such that a clearance is defined between the shroud ring and the shroud blocks;
  a plurality of magnets embedded within the shroud ring; and
  a brush seal comprising:
  a frame attached to the casing; and
  a plurality of magnetically responsive filaments each extending from the frame to a free end, wherein the plurality of magnets is oriented such that the plurality of magnetically responsive filaments is attracted to and forced into sealing engagement with the shroud ring by the plurality of magnets, the plurality of magnetically responsive filaments at least partially covering the clearance, whereby a flow of fluid across the clearance is restricted.

12. The rotor assembly as in claim 11, wherein the plurality of magnetically responsive filaments is sloped with respect to a radial direction of the turbomachine such that the plurality of magnetically responsive filaments slide along a surface of the shroud ring during operation of the turbomachine.

13. The rotor assembly as in claim 11, wherein the shroud ring defines a trench having a forward wall and an aft wall, and wherein the filaments extend into the trench between the forward wall and the aft wall.

14. The rotor assembly as in claim 13, wherein plurality of magnets is positioned adjacent to one of the forward wall or the aft wall of the trench.

15. The rotor assembly as in claim 11, wherein the plurality of magnetically responsive filaments is formed at least partially from a ferrous material.

16. The rotor assembly as in claim 11, wherein the plurality of magnetically responsive filaments is formed of a non-ferrous material at least partially coated with a ferrous material.

17. The rotor assembly as in claim 11, wherein the plurality of magnets is a first plurality of magnets, wherein a second plurality of magnets is embedded within the shroud blocks adjacent to the frame.

18. The rotor assembly as in claim 17, wherein the second plurality of magnets is configured to be activated and deactivated, and wherein the plurality of magnetically responsive filaments may move towards the plurality of shroud blocks to a retracted position when the plurality of second magnets is activated.

19. The rotor assembly as in claim 18, wherein second plurality of magnets is a plurality of electromagnets controllable by a controller.

* * * * *